United States Patent
McKenney

(10) Patent No.: US 8,706,706 B2
(45) Date of Patent: Apr. 22, 2014

(54) FAST PATH FOR GRACE-PERIOD DETECTION FOR READ-COPY UPDATE SYSTEM

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1633 days.

(21) Appl. No.: 11/854,840

(22) Filed: Sep. 13, 2007

(65) Prior Publication Data

US 2009/0077080 A1    Mar. 19, 2009

(51) Int. Cl.
*G06F 17/00* (2006.01)
*G06F 17/30* (2006.01)
*G06F 7/00* (2006.01)
*G06F 9/52* (2006.01)

(52) U.S. Cl.
CPC .... *G06F 17/30356* (2013.01); *G06F 17/30578* (2013.01); *G06F 9/52* (2013.01); *G06F 9/526* (2013.01)
USPC ............................ 707/704; 707/695; 707/610

(58) Field of Classification Search
CPC ..... G06F 9/52; G06F 9/526; G06F 17/30356; G06F 17/30578
USPC ............................................................ 707/8
See application file for complete search history.

(56) References Cited

U.S. PATENT DOCUMENTS

| | | | |
|---|---|---|---|
| 5,442,758 A | 8/1995 | Slingwine et al. | |
| 5,608,893 A | 3/1997 | Slingwine et al. | |
| 5,727,209 A | 3/1998 | Slingwine et al. | |
| 6,219,690 B1 | 4/2001 | Slingwine et al. | |
| 6,886,162 B1 | 4/2005 | McKenney | |
| 6,996,812 B2 | 2/2006 | McKenney | |
| 2005/0149634 A1 | 7/2005 | McKenney | |
| 2005/0198030 A1 | 9/2005 | McKenney | |
| 2006/0090104 A1 | 4/2006 | McKenney et al. | |
| 2006/0100996 A1 | 5/2006 | McKenney | |
| 2006/0112121 A1 | 5/2006 | McKenney et al. | |
| 2006/0117072 A1 | 6/2006 | McKenney | |
| 2006/0123100 A1 | 6/2006 | McKenney et al. | |
| 2006/0130061 A1 | 6/2006 | McKenney et al. | |
| 2006/0265373 A1 | 11/2006 | McKenney et al. | |
| 2007/0083565 A1 | 4/2007 | McKenney | |
| 2007/0101071 A1 | 5/2007 | McKenney | |

OTHER PUBLICATIONS

J. Seigh, "RCU + SMR for preemptive kernel/user threads," Linux Kernel Mailing List, May 9, 2005, 2 pages.
M. Michael, "Hazard Pointers: Safe Memory Reclamation for Lock-Free Objects," IEEE Transactions on Parallel and Distributed Systems, Jun. 2004, vol. 15, No. 6, pp. 491-504.
D. Sarma et al., "Making RCU Safe for Deep Sub-Millisecond Response Realtime Applications," 2004 USENIX (UseLinux track) Jun. 2004, 9 pages.

(Continued)

*Primary Examiner* — Ann Chempakaseril
(74) *Attorney, Agent, or Firm* — Walter W. Duft

(57) ABSTRACT

A technique for implementing fast path grace period detection for deferring the destruction of a shared data element until pre-existing references to the data element are removed. A check is made, without using locks to exclude other updaters, for the presence of readers that are accessing the shared data elements. Grace period detection is terminated to initiate deferred destruction of the data element if there are no readers accessing the shared data element. If there are readers accessing the shared data element, a lock is implemented and another check is made for the presence of the readers.

14 Claims, 8 Drawing Sheets

(56) References Cited

OTHER PUBLICATIONS

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Linux Journal, Oct. 1, 2003, 11 pages.

P. McKenney et al.,"Read-Copy Update," 2002 Ottawa Linux Symposium, Jul. 8, 2002, 28 pages.

H. Linder et al., "Scalability of the Directory Entry Cache," 2002 Ottawa Linux Symposium, Jun. 26, 2002, pp. 289-300.

P. Mckenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

"Priority Inversion," Wikipedia, Feb. 4, 2007, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May 5, 2005, 2 pages.

O. Nesterov, QRCU: 'Quick' SRCU Implementation, Linux Kernel Mailing List, Dec. 1, 2005, 3 pages.

FAST PATH FOR GRACE-PERIOD DETECTION FOR READ-COPY UPDATE SYSTEM

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns an implementation of a mutual exclusion mechanism known as "read-copy update." Still more particularly, the invention is directed to a technique for increasing the speed of read-copy update grace period detection.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is available for the benefit of other read operations that access the data following the update. These other read operations will never see the stale data and so the updater does not need to be concerned with them. However, the updater does need to avoid prematurely removing the stale data being referenced by the first group of read operations. Thus, in the second (deferred update) phase, the old data state is only removed following a "grace period" that is long enough to ensure that the first group of read operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock, allocating new memory for B', copying the contents of B to B', modifying B' as needed, updating the pointer from A to B so that it points to B', and releasing the lock. As an alternative to locking, other techniques such as non-blocking synchronization, transactional memory, or a designated update thread could be used to serialize data updates. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU (as can other operations that will not be listed here). As further explained below, in some read-copy update implementations, all reader operations that are outside of an RCU read-side critical section are quiescent states.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period. One commonly used technique is to have updaters block (wait) until a grace period has completed. This technique has been used to implement a form of read-copy update known as SRCU (Sleepable RCU) wherein readers are allowed to sleep within RCU protected critical sections. The technique contemplates that an updater of a shared data element will first perform an initial (first phase) data update operation that creates the new view of the data being updated. Then, at a later time, the updater performs a deferred (second phase) data update operation that removes the old view of the data being updated. An RCU subsystem representing a set of primitives that can be called by readers and updaters is used to monitor per-processor quiescent state activity in order to detect when each processor's current grace period has expired. As each grace period expires, deferred data updates that are ripe for processing are executed.

The RCU subsystem primitives that readers can invoke in order to facilitate grace period detection may include a pair of fast path routines used by the readers to register and deregister with the RCU subsystem prior to and following critical section read-side operations, thereby allowing the readers to signal the RCU subsystem when a quiescent state has been reached. The rcu_read_lock( ) and rcu_read_unlock( ) primitives of recent Linux® kernel versions are examples of such routines. The rcu_read_lock( ) primitive is called by a reader immediately prior to entering an RCU read-side critical section and the rcu_read_unlock( ) primitive is called by the reader upon leaving the RCU read-side critical section. In some RCU implementations, this type of grace period detection is implemented using a pair of counters and an index. One counter of each counter pair corresponds to a current grace period generation and the other counter corresponds to a previous grace period generation. The index indicates which counter is current. When a reader enters an RCU read-side critical section, it atomically increments the counter identified by the index that corresponds to the current grace period. Then the reader atomically decrements the counter when it leaves the RCU read-side critical section. Grace period advancement and deferred data element update processing will not be performed until it is determined that the reader has performed the counter decrementation, thereby ensuring that the data element can be freed without incident.

When an updater performs a data element update, it starts a new grace period by changing the index to "flip" the roles of the counters. Additional operations may be performed by the updater to ensure that readers are aware of the counter flip and do not mistakenly manipulate the wrong counter, such as by maintaining a bias value on the current counter. New readers that subsequently enter their RCU read-side critical sections will now use the "new" current counter while the old readers that are using the non-current counter will periodically exit their RCU read-side critical sections, decrementing the non-current counter as they do so. When the non-current counter is decremented to zero, indicating that all readers have left their read-side critical section, the previous grace period is deemed to have expired and the updater may free the stale data element that resulted from the data element update.

The foregoing update processing can produce significant update-side latencies, even when there are no RCU read-side critical sections in progress. Updating the index to perform the counter flip, setting a bias value, and testing the non-current counter for zero incurs processing overhead. The latency is due to the fact that these mechanisms are designed to favor read-side performance and scalability. They therefore minimize the coordination required on the part of readers. For example, if the updater does not take steps to ensure that readers are manipulating the correct counter, a reader could end up incrementing a counter that has just been switched to the non-current state. This means that updaters do not get to wait only until the non-current counters reach zero; they must also wait until they can be sure that there are no readers who are just about to increment the non-current counter. This can be problematic in cases where RCU read-side critical sections are either extremely short or bursty, such that there is a high probability that updates will occur when there are no readers present. In such cases, the above-described RCU implementation will unnecessarily delay updates.

An RCU implementation known as QRCU represents a prior art solution to this problem. In QRCU, the updater acquires a lock on the counters to exclude other updaters, and performs a check of the current counter to see if it indicates the presence of any readers within an RCU read side critical section. If the current counter indicates that no readers are present, the updater releases the counter lock, exits from the grace period detection sequence, and immediately frees the stale data element that resulted from the update operation that initiated grace period detection. On the other hand, if the counter indicates that a reader is engaged in RCU critical section processing, the updater performs conventional slow path grace period detection by flipping the counters, transferring a bias value from the non-current counter to the (new) current counter, releasing the counter lock, and blocking until the non-current counter decrements to zero. Although this solution decreases updater overhead and latency in the absence of readers, there is still delay associated with acquiring and releasing the counter lock.

It is to solving the foregoing problem that the present invention is directed. In particular, what is required is a read-copy update technique that reduces updater grace period detection overhead in cases where RCU read-side critical sections are short or bursty, yet which avoids the overhead associated with locking. These requirements will preferably be met in a manner that avoids excessive complexity of the grace period detection mechanism itself.

SUMMARY OF THE INVENTION

The foregoing problems are solved and an advance in the art is obtained by a method, system and computer program product for implementing fast path grace period detection for deferring the destruction of a shared data element until pre-existing references to the data element are removed. A check is made, without using locks to exclude other updaters, for the presence of readers that are accessing the shared data elements. Grace period detection is terminated to initiate deferred destruction of the data element if there are no readers accessing the shared data element. If there are readers accessing the shared data element, a lock is implemented and another check is made for the presence of the readers.

The checking may include consulting a pair of counters that readers manipulate when accessing the shared data element. This can be done by summing the counters. More particularly, two counter summations may be performed. If desired, a memory barrier may be implemented between the summations. In that case, there may be a first summation of the counters followed by implementing a memory barrier if the result of the first counter summation is a value indicating the absence of readers accessing the shared data element. A second summation of the counters may then be performed and grace period detection may be terminated if the result of the second counter summation is a value indicating the absence of readers accessing the shared data element. If one of the counters has a bias value indicating that the counter is a current counter, the value indicating the absence of readers accessing the shared data element can be any value that is less than or equal to the bias value.

BRIEF DESCRIPTION OF THE DRAWINGS

The foregoing and other features and advantages will be apparent from the following more particular description of exemplary embodiments, as illustrated in the accompanying Drawings, in which.

DETAILED DESCRIPTION OF EXEMPLARY EMBODIMENTS

Figure 1A:
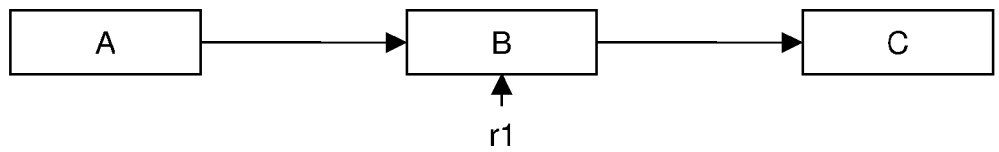
FIGS. 1A-1D are diagrammatic representations of a linked list of data elements undergoing a data element replacement according to a conventional read-copy update mechanism.
Figure 1B:
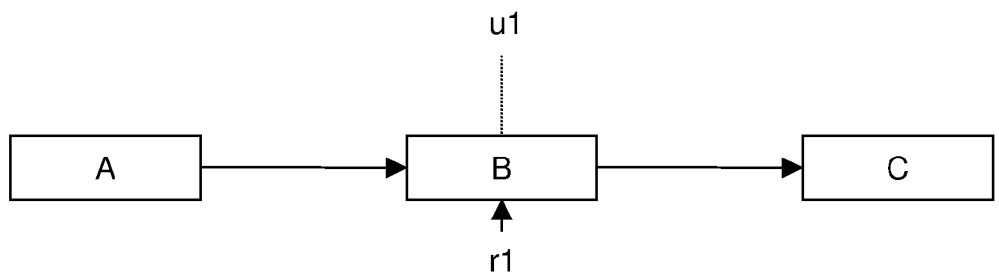
Figure 1C:
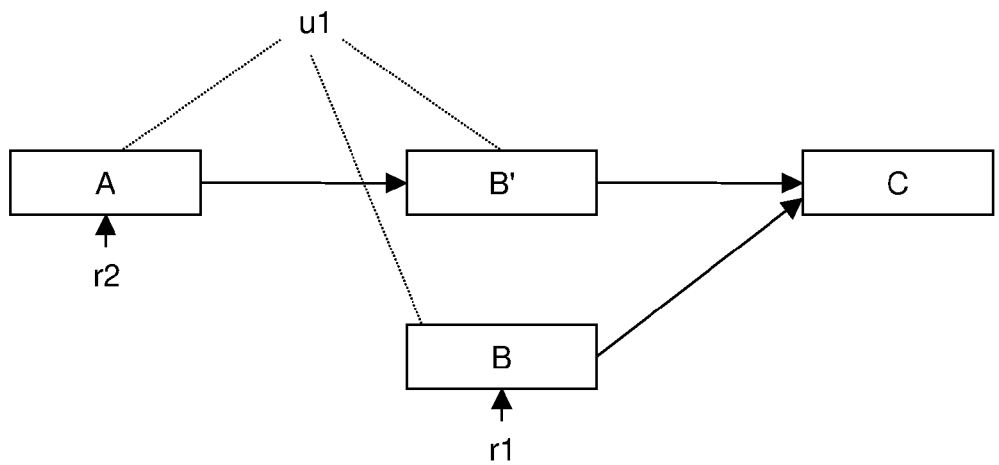
Figure 1D:
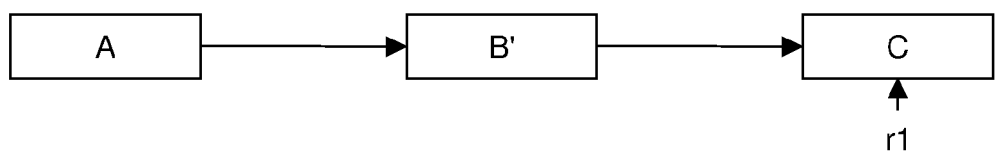
Figure 2A:
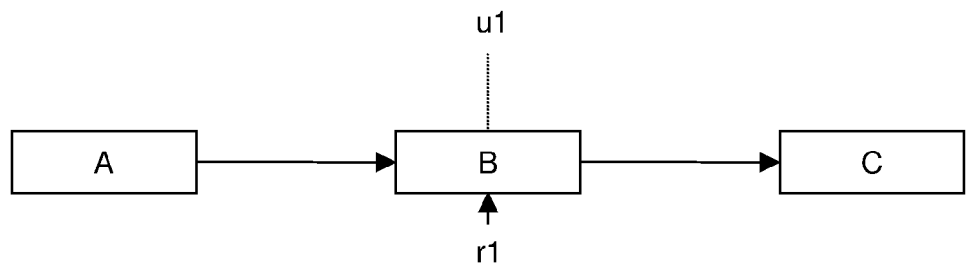
FIGS. 2A-2C are diagrammatic representations of a linked list of data elements undergoing a data element deletion according to a conventional read-copy update mechanism.
Figure 2B:
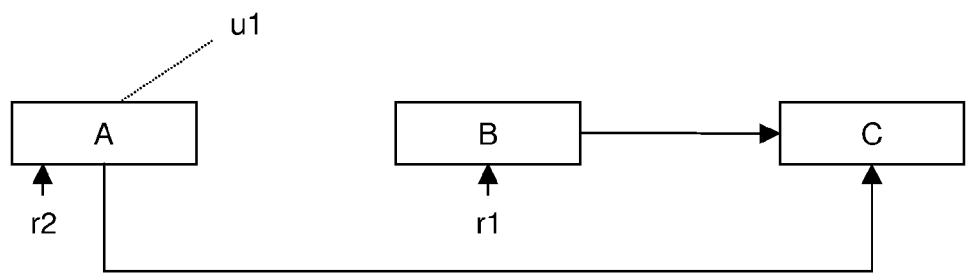
Figure 2C:
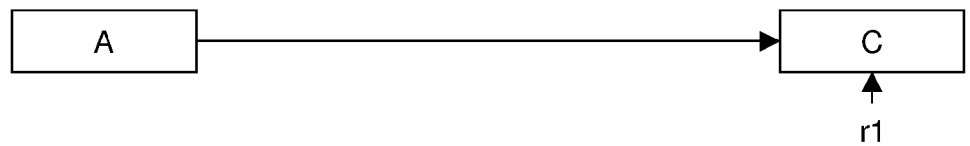
Figure 3:
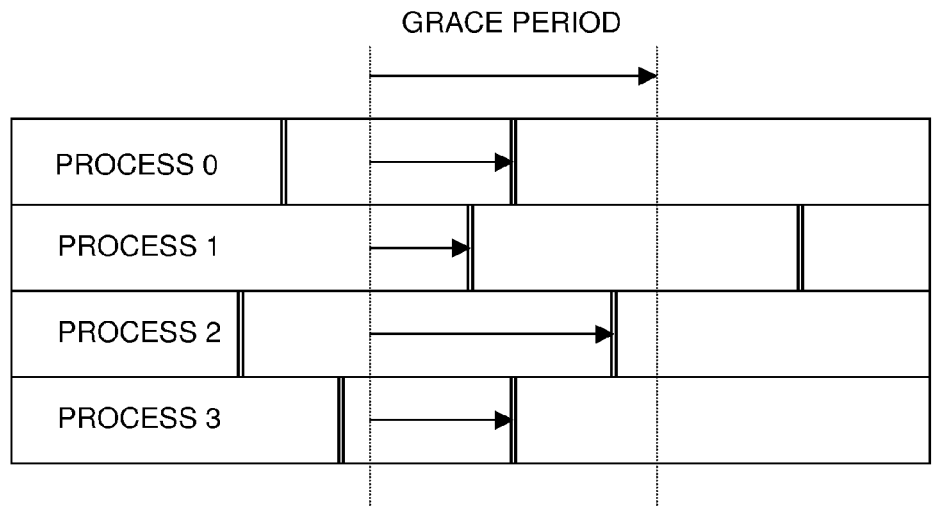
FIG. 3 is a flow diagram illustrating a grace period in which four processes pass through a quiescent state.
Figure 4:
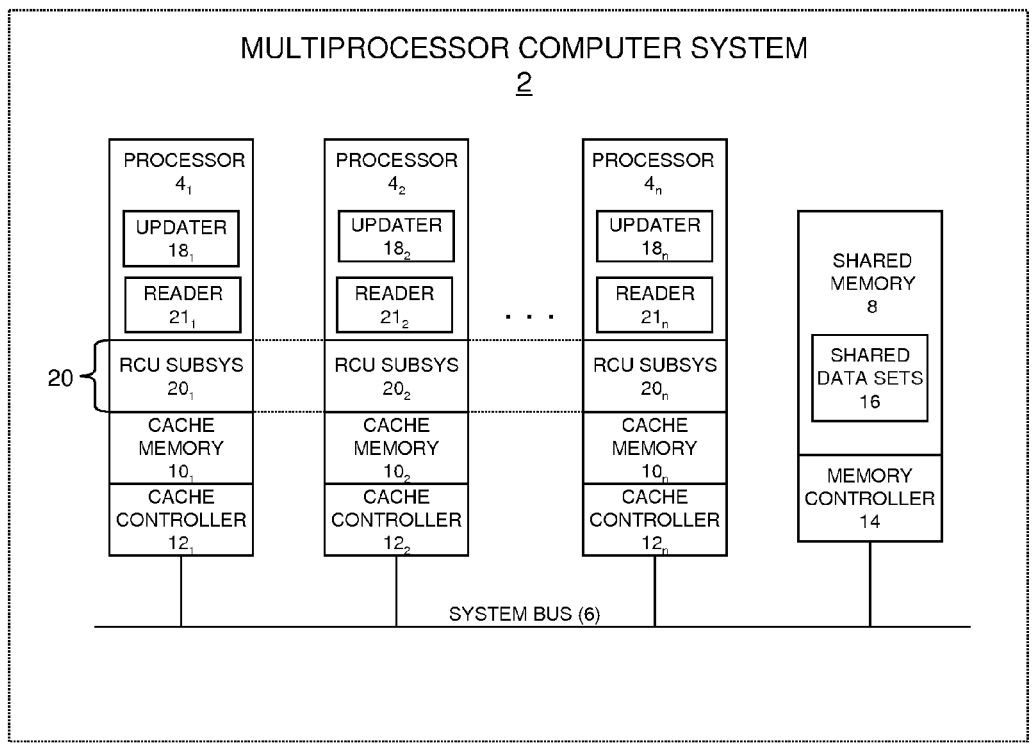
FIG. 4 is a functional block diagram showing a multiprocessor computing system that represents an exemplary environment for implementing grace period detection processing in accordance with the disclosure herein.

Turning now to the figures, wherein like reference numerals represent like elements in all of the several views, FIG. 4 illustrates an exemplary computing environment in which improved fast path RCU grace period detection may be implemented. In particular, a symmetrical multiprocessor (SMP) computing system 2 is shown in which multiple processors $4_1, 4_2 \ldots 4_n$ are connected by way of a common system bus 6 to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8. The computing system 2 is assumed to be under the management of a single multitasking operating system adapted for use in an SMP environment. In the alternative, a single processor computing environment could be used, as could a hardware multithreading environment, a multi-core environment and a NUMA (Non-Uniform Memory Access) environment, to name but a few. Furthermore, multiple multitasking operating systems might all run concurrently on the same hardware under the control of a hypervisor, and some or all of these operating systems might implement read-copy update (RCU) synchronization, including the fast path grace period detection technique described herein, as could the hypervisor itself.

It is further assumed that update operations executed within kernel or user mode processes, threads, or other execution contexts will periodically perform updates on a set of shared data 16 stored in the shared memory 8. Reference numerals $18_1, 18_2 \ldots 18_n$ illustrate individual data update operations (updaters) that may periodically execute on the several processors $4_1, 4_2 \ldots 4_n$. As described by way of background above, the updates performed by the data updaters $18_1, 18_2 \ldots 18_n$ can include modifying elements of a linked list, inserting new elements into the list, deleting elements from the list, and many other types of operations. To facilitate such updates, the several processors $4_1, 4_2 \ldots 4_n$ are programmed to implement a read-copy update (RCU) subsystem 20, as by periodically executing respective RCU instances $20_1, 20_2 \ldots 20_n$ as part of their operating system or user application functions. The updaters $18_2 \ldots 18_n$ use the RCU subsystem 20 to perform grace period detection that assists the updaters in performing deferred (second phase) data element updates following initial (first phase) updates that are also implemented by the updaters. As described by way of background above, these deferred updates involve the destruction of stale data elements, but they are not performed until the end of a grace period is detected by the RCU subsystem 20.

Each of the processors $4_1, 4_2 \ldots 4_n$ also periodically executes read operations (readers) $21_1, 21_2 \ldots 21_n$ on the shared data 16. Such operations will typically be performed far more often than updates, insofar as this is one of the premises underlying the use of read-copy update. However, the read operations are assumed to be of short duration or are bursty in nature, such that there is high probability that updates will occur when no readers $21_1, 21_2 \ldots 21_n$ are present, this being one of the justifications for fast path grace period detection. The readers $21_1, 21_2 \ldots 21_n$ register with the RCU subsystem 20 when they enter an RCU read-side critical section and deregister when critical section processing terminates. As described by way of background above, this allows the updaters $18_1, 18_2 \ldots 18_n$ to monitor RCU read-side critical section activity.

Figure 5:
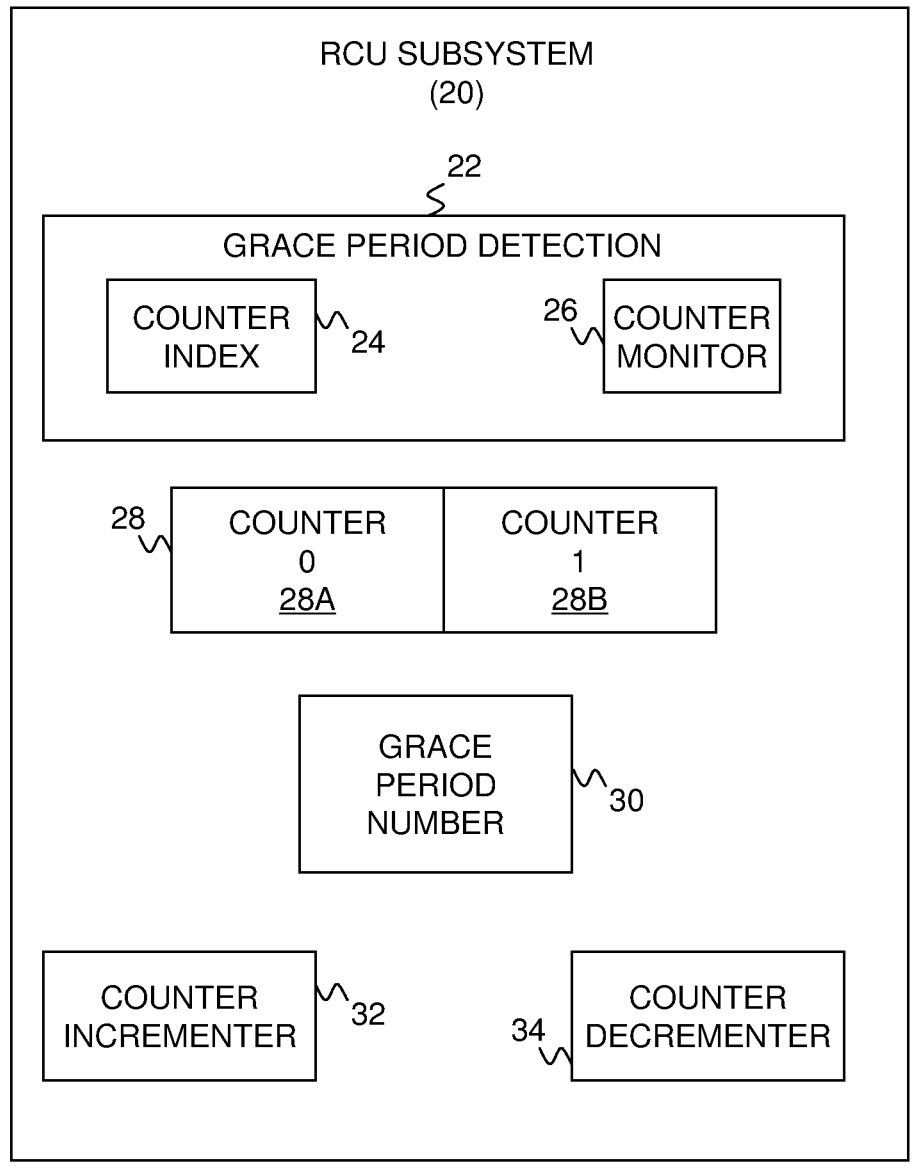
FIG. 5 is a functional block diagram showing a read-copy update subsystem implemented by each processor in the multiprocessor computer system of FIG. 4.

FIG. 5 illustrate components of the RCU subsystem 20 that may be used by the updaters $18_2 \ldots 18_n$ to perform grace period detection, and by the readers $21_1, 21_2 \ldots 21_n$ to advise when they are engaged in RCU read-side processing. A grace period detection component 22 includes a counter index 24 and a counter monitor 26 that tracks counters 28A and 28B of a counter pair 28 in order to determine when a grace period has expired. The counter monitor 26 may also keep track of a grace period number 30 that can be used to set the counter index 24. Advancement of the grace period number 30 signifies that a new grace period should be started and that detection of the end of the previous grace period may be initiated. The RCU subsystem 20 also provides two fast-path routines that the readers $21_1, 21_2 \ldots 21_n$ can invoke in order to register and deregister with the RCU subsystem prior to and following RCU read-side operations. In FIG. 5, reference numeral 32 (labeled 'Counter Incrementer') represents an RCU reader registration component that may be implemented using code such as the qrcu_read_lock( ) primitive that is part of the prior art QRCU implementation described by way of background above. This primitive will register a reader $21_1, 21_2 \ldots 21_n$ with the RCU subsystem 20 by incrementing one of the counters 28A/28B that is determined to be a current counter from the counter index 24. The value of the counter index 24 can be determined from the lowest order bit of the grace period number 28, which is a Boolean value that alternates between "1" and "0" each time the grace period number is incremented. Reference numeral 34 labeled "Counter Decrementer" represents an RCU reader deregistration component that may be implemented using code such as the qrcu_read_unlock( ) primitive that is also part of the prior art QRCU implementation. This primitive will deregister a reader $21_1, 21_2 \ldots 21_n$ upon leaving its critical section by decrementing the counter 28A/28B that was previously incremented on behalf of the reader.

As will now be described with further reference to the flow diagram of FIG. 6, the grace period detection system 22 can be invoked by an updater $18_1, 18_2 \ldots 18_n$ to perform fast path grace period detection in a manner now to be described. As will be seen, fast path grace period detection may be quickly and efficiently performed according to FIG. 6 by checking for the presence of readers $21_1, 21_2 \ldots 21_n$ engaged in RCU read-side processing without using any locks to exclude other updaters. Summarizing in advance, the check for readers $21_1, 21_2 \ldots 21_n$ can be easily performed by performing two counter summations and by implementing an optional memory barrier. If either counter summation indicates that there are readers $21_1, 21_2 \ldots 21_n$ performing RCU read-side critical processing, conventional slow path grace period detection may be performed according to FIGS. 7A and 7B. On the hand, if both counter summations indicate that there are no readers $21_1, 21_2 \ldots 21_n$ engaged in RCU read-side processing, grace period detection is terminated and the stale data element resulting from the update operation that initiated grace period detection can be free immediately.

Figure 6:
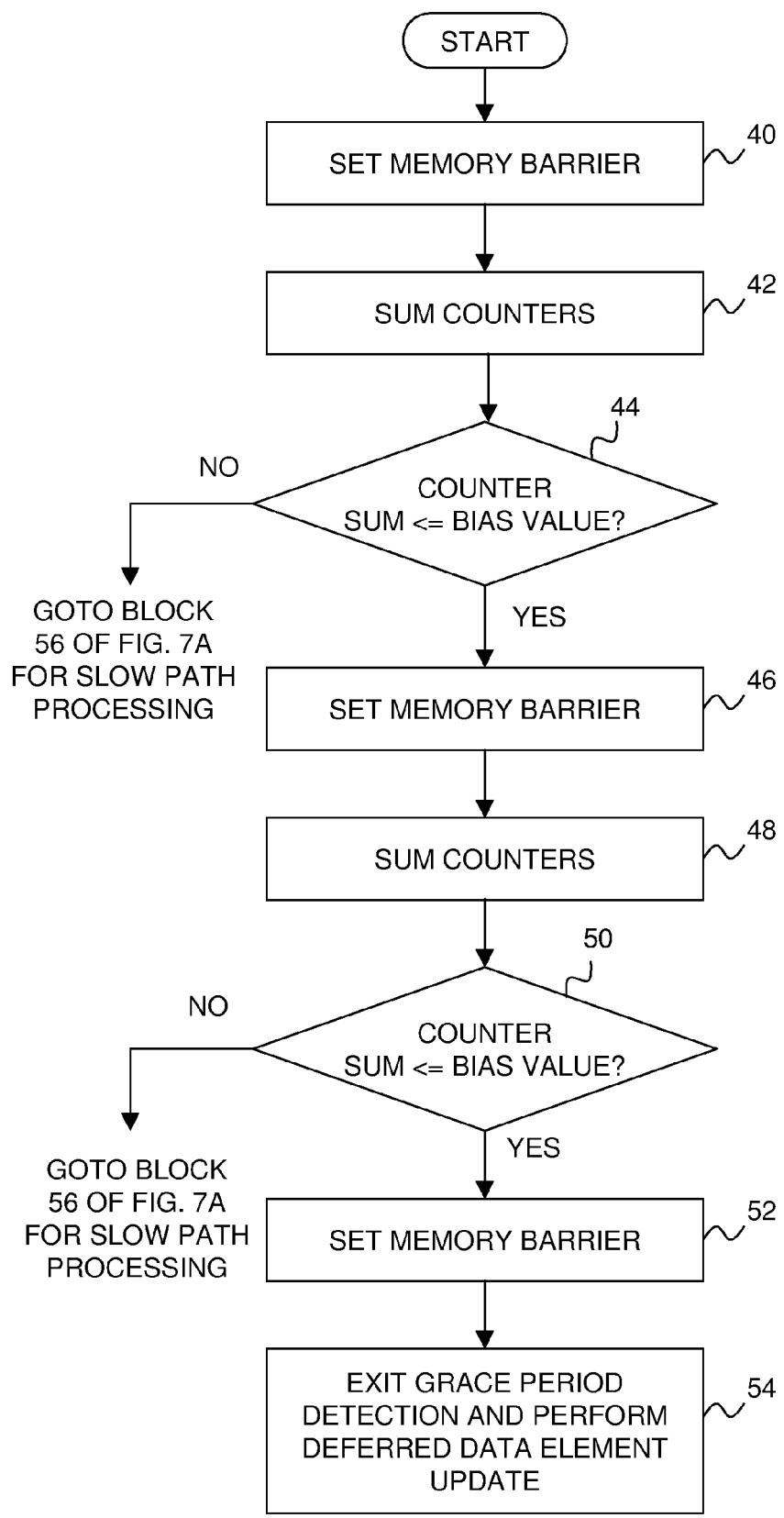
FIG. 6 represents a flow diagram showing exemplary fast path grace period detection that may be performed by the read-copy update subsystem of FIG. 4.

Turning now to FIG. 6, representing exemplary fast path grace period detection according to the disclosure herein, block 40 represents an optional memory barrier instruction (for systems with weak memory ordering) that may be implemented by the grace period detection component 22 so that any prior counter manipulations will be seen by other processors $4_1, 4_2 \ldots 4_n$ before fast path grace period detection commences. Block 42 represents a read of each counter 28A and 28B and a summation of the counter values by the counter monitor 26. In block 44, the counter monitor 26 determines whether the counter sum represents a value that is indicative of no readers $21_1, 21_2 \ldots 21_n$ being within RCU read-side critical sections. If biasing according to the prior art QRCU implementation is used, the counter summation of block 44 would test for any value less than two. This is because an updater according to the conventional QRCU implementation initializes the current counter with a bias value of one prior to the counter flip (other bias values could also be used), and removes the bias value from the non-current counter prior to testing it for zero. In this way, readers in a conventional QRCU environment can perform a quick check (by testing for a counter value of not zero) to ensure they are operating on the correct counter.

If an initial QRCU bias value has been applied to one of counters 28A and 28B that is the current counter, the sum when there is no concurrent RCU read-side processing will not exceed the bias value. Thus, if a bias value of one is used, testing for a sum of less than two ensures a correct result. If the counter sum indicates that there are readers $21_1, 21_2 \ldots 21_n$ engaged in RCU read-side processing (e.g., the sum is two or greater), fast path grace period detection is terminated and slow path grace period detection is initiated by the counter monitor 26 in block 56 of FIG. 7A.

Figure 7A:
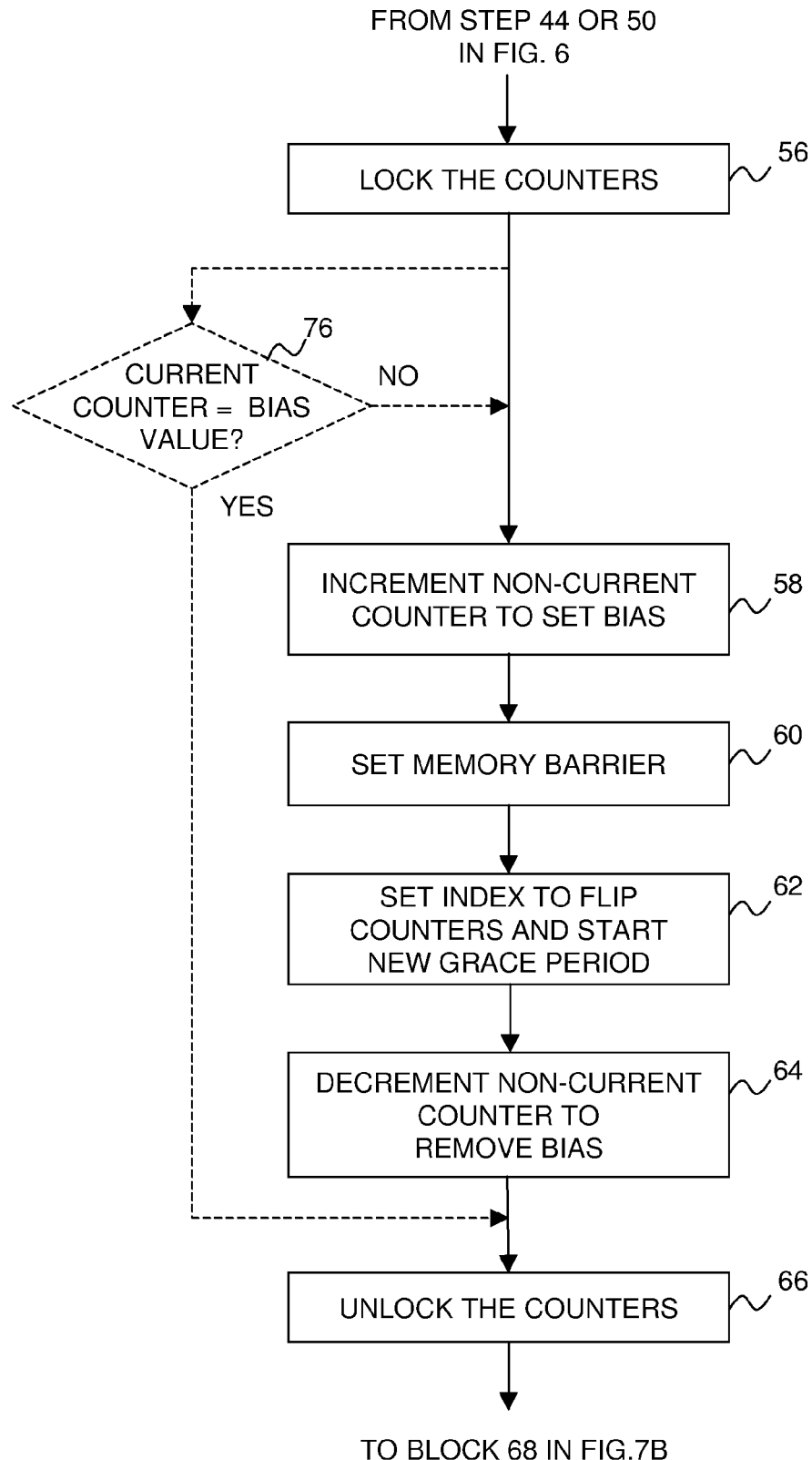
FIGS. 7A and 7B represent a flow diagram showing conventional slow path grace period detection that may be performed by the read-copy update subsystem of FIG. 4 if fast path grace period detection shows the presence of a reader.

If the counter sum determination in block 44 indicates that there is no ongoing RCU read-side processing (the "Yes" path out of block 44), an optional memory barrier instruction may be implemented by the counter monitor 26 in block 46 (for systems with weak memory ordering) in order to ensure that counter sum and test operations of blocks 42 and 44 are implemented and the results are available across all of the processor $4_1, 4_2 \ldots 4_n$. In block 48, the counter monitor 26 performs a second counter read and counter summation, and makes a second determination in block 50 to ensure that there are still no readers $21_1, 21_2 \ldots 21_n$ engaged in RCU read-side processing. If this is not the case, block 56 of FIG. 7A is invoked and slow path grace period detection is performed. If the second counter summation does confirm that there are still no readers $21_1, 21_2 \ldots 21_n$ engaged in RCU read-side processing (the "yes" path out of block 50), an optional memory barrier instruction (for systems with weak memory ordering) may be implemented by the grace period detection component 22 in block 52 in order to synchronize with readers $21_1, 21_2 \ldots 21_n$ on other processors $4_1, 4_2 \ldots 4_n$. In particular, the memory barrier of block 52 will ensure that the second counter read and summation of block 50 is completed before the processing of block 54 is performed. In block 54, grace period detection is terminated and the updater $18_1, 18_2 \ldots 18_n$ may remove any stale data element resulting from the update that initiated grace period detection.

The reason that two counter summations are used is because it is not possible on currently available hardware to fetch both of the counters 28A and 28B atomically (i.e., simultaneously with respect to other updaters). Thus, it is possible for a race condition to arise wherein another updater $18_1, 18_2 \ldots 18_n$ makes counter modifications subsequent to the current updater reading the counter 28A but before reading the counter 28B. Because the second updater $18_1, 18_2 \ldots 18_n$ could swap the bias value from one counter to the other between the current updater's counter reads, a false second counter value could be fetched and produce an incorrect summation. As an example, consider the situation shown in FIG. 8 where the first counter 28A is zero and the second counter 28B is two, representing the bias value of one plus the presence of one reader. Summing the counters 28A and 28B should produce a summation value of two, indicating that it is not safe for the current updater $18_1, 18_2 \ldots 18_n$ to end the grace period. However, after the current updater $18_1, 18_2 \ldots 18_n$ reads the first value counter value of zero, assume that another updater engaged in slow path grace period detection flips the counters and transfers the bias value from the second counter 28B to the first counter 28A. Both counters 28A and 28B will now show a value of one. At this point, the current updater $18_1, 18_2 \ldots 18_n$ reads the second counter 28B, sees that its value is one, and adds this value to the previously read counter value of zero to obtain a sum of one. If the current updater $18_1, 18_2 \ldots 18_n$ relied on this value, it would end the grace period prematurely without detecting the presence of the reader. Note that there can be at most one reader $21_1, 21_2 \ldots 21_n$ present in order for this race condition to arise. Otherwise, the current updater $18_1, 18_2 \ldots 18_n$ will see a counter summation of two or more and will switch over to slow path grace period detection, as is appropriate.

Figure 8:
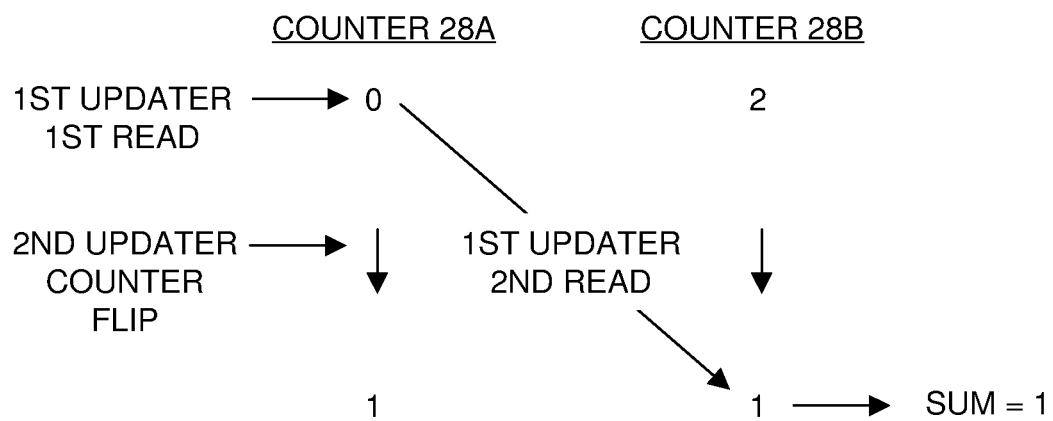
FIG. 8 is diagrammatic illustration showing an exemplary race condition between a first updater performing fast path grace period detection and a second updater manipulating the counters during slow path grace period detection.

The double summation ensures that the counter summation is correct. In the example of FIG. 8, the current updater $18_1, 18_2 \ldots 18_n$ would learn from the second summation that the counter sum is actually two, and would thus terminate fast path grace period detection. Note that a repeat of the above-described race condition during the second summation is not possible. The only way that a third updater $18_1, 18_2 \ldots 18_n$ could flip the counter 28A and 28B between the two counter reads of the second summation is if the second updater completed its slow path critical section processing. This can only occur if the reader exits its RCU read-side critical section. Thus, a correct result will be achieved because the reader that was in progress when the first updater $18_1, 18_2 \ldots 18_n$ initiated grace period detection must have completed, so it is possible for first updater to end its grace period based solely on the double summation.

Figure 7B:
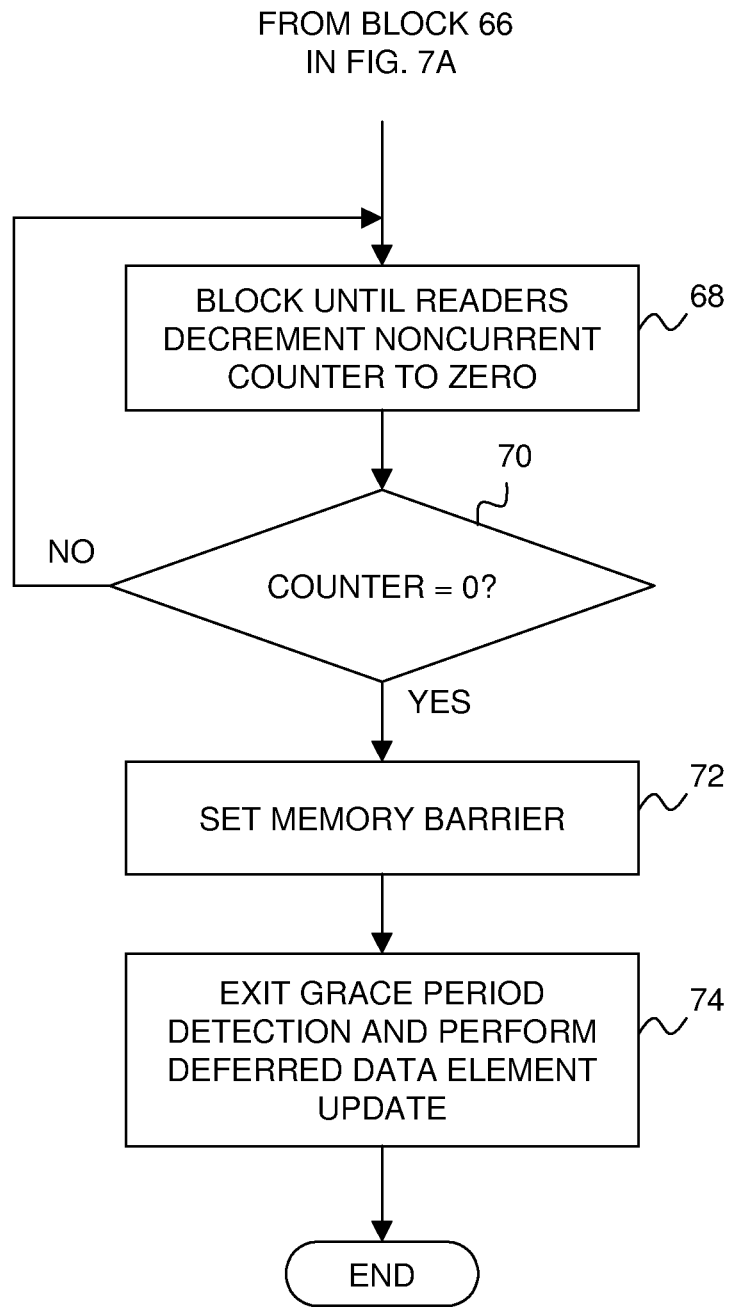

Turning now to FIGS. 7A and 7B, conventional QRCU slow path grace period detection may be performed if the fast path grace period detection of FIG. 6 shows the presence of one or more readers $21_1$, $21_2$ ... $21_n$ (the "ho" path out of blocks 44 and 50). As described by way of background above, QRCU slow path grace period detection entails implementing a lock to prevent other updaters from manipulating the counters 28A and 28B, starting a new grace period by flipping the counters (and optionally setting a counter bias), and checking for the presence of readers $21_1$, $21_2$ ... $21_n$ on the non-current counter until there are none. In block 56 of FIG. 7A, the grace period detection component 22 locks the counters 28A and 28B. Block 58 represents the counter monitor 26 optionally incrementing the non-current one of the counters 28A and 28B (soon to become the current counter after the counter flip) to set its bias, if such is desired. In block 60, the counter monitor 26 implements an optional memory barrier instruction (for systems with weak memory ordering) to ensure that the bias setting operation of block 58 is seen by other processors $4_1$, $4_2$ ... $4_n$ (before the bias removal operation of block 64 below). In block 62, the counter monitor 26 sets the counter index 24 to flip the counters and start a new grace period. In block 64, the counter monitor 26 optionally decrements the non-current counter (the previous current counter before the counter flip) to remove its bias (if present). In block 66, the grace period detection component 22 unlocks the counters 28A and 28B. In blocks 68 and 70 of FIG. 7B, the counter monitor 26 blocks (thus also blocking the updater $18_1$, $18_2$ ... $18_n$ that initiated grace period detection) until the non-current counter reaches a value (e.g., zero) indicating that there are no more readers $21_1$, $21_2$ ... $21_n$ engaged in RCU read-side processing. Per conventional QRCU slow path grace period detection, the counter monitor 26 may be periodically woken up by the counter decrementer 34 each time a reader $21_1$, $21_2$ ... $21_n$ exits an RCU critical section. The counter monitor 26 will recheck the non-current counter and resume blocking if it is still nonzero. When the non-current counter finally does reach zero, the grace period detection component 22 may implement an optional memory barrier in block 72 (for systems with weak memory ordering) in order to synchronize with readers $21_1$, $21_2$ ... $21_n$ on other processors. In particular, the memory barrier of block 72 will ensure that the counter check of block 70 is completed before the processing of block 74 is performed. In block 74, grace period detection is terminated and the updater $18_1$, $18_2$ ... $18_n$ can perform a deferred data element update by removing any stale data element that resulted from the update that initiated grace period detection.

As a modification of the foregoing QRCU slow path grace period detection processing of FIGS. 7A and 7B, it would be possible to first perform conventional QRCU fast path grace period processing. As described by way of background above, conventional QRCU fast path grace period processing entails locking the counters 28A and 28B to prevent manipulation by other updaters $18_1$, $18_2$ ... $18_n$ and testing for the presence of readers (e.g., counter value>bias value). If there are no readers, the counters are unlocked and any stale data element created by the current updater $18_1$, $18_2$ ... $18_n$ is freed. If there are readers, the counters remain locked and conventional QRCU slow path grace period detection is performed. According to the proposed modification to the processing of FIGS. 7A and 7B, if the improved fast path grace period detection processing of FIG. 6 shows the presence of a reader, the grace period detection component 22 could then implement conventional QRCU fast path grace period processing. In particular, between block 56 and 58 of FIG. 7A, a test of the current counter would be made according to optional block 76, with processing jumping to block 66 if the test showed no readers $21_1$, $21_2$ ... $21_n$ (the "yes" path out of block 56). Otherwise, processing would proceed to block 58. If the conventional QRCU fast path grace period processing showed that the reader has exited its RCU read-side critical section, grace period detection could be terminated without performing the slow path grace period detection processing of FIGS. 7A and 7B. The benefit of the foregoing modification is that the conventional QRCU fast path grace period processing provides a second opportunity to avoid slow path grace period detection. The overhead associated with the QRCU fast path locking and unlocking operations is justified by the fact that this is still much less burdensome on the updater $18_1$, $18_2$ ... $18_n$ than conventional slow path grace period detection.

Figure 9:
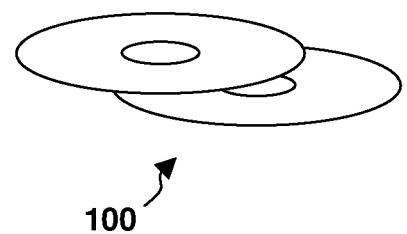
FIG. 9 is a diagrammatic illustration showing media that may be used to provide a computer program product for implementing grace period detection processing in accordance with the disclosure herein.

Accordingly, a technique for fast path RCU grace period detection has been disclosed. It will be appreciated that the foregoing concepts may be variously embodied in any of a data processing system, a machine implemented method, and a computer program product in which programming logic is provided by one or more machine-useable media for use in controlling a data processing system to perform the required functions. Exemplary machine-useable media for providing such programming logic are shown by reference numeral 100 in FIG. 9. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic described above, either alone or in conjunction with another software product that incorporates the required functionality. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or medium (such as a network), or other entity that can contain, store, communicate, propagate or transport the programming logic for use by or in connection with a data processing system, computer or other instruction execution system, apparatus or device.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for fast path detection by an updater of a grace period for deferring the destruction of a shared data element by said updater until pre-existing references to said shared data element are removed, comprising:
    checking for the presence of readers that are accessing said shared data element without using locks to exclude other updaters;
    terminating grace period detection to initiate deferred destruction of said data element if there are no readers accessing said shared data element;
    if there are readers accessing said shared data element, implementing a lock and checking again for the presence of said readers;

wherein said checking comprises consulting a pair of counters that readers manipulate when accessing said shared data element;

wherein said checking comprises summing said counters.

2. A method in accordance with claim 1 wherein said checking comprises performing two counter summations.

3. A method in accordance with claim 2 wherein said checking comprises implementing a memory barrier between said summations.

4. A method in accordance with claim 2 wherein said checking comprises performing a first summation of said counters, implementing a memory barrier if the result of said first counter summation is a value indicating the absence of readers accessing said shared data element, performing a second summation of said counters, and terminating grace period detection if the result of each of said first counter summation and said second counter summation is a value indicating the absence of readers accessing said shared data element.

5. A method in accordance with claim 4 wherein one of said counters has a bias value indicating that said counter is a current counter and said value indicating the absence of readers accessing said shared data element is any value that is less than or equal to said bias value.

6. A data processing system having one or more processors, a memory and a communication pathway between the one or more processors and the memory, said system being adapted to perform fast path detection by an updater of a grace period for deferring the destruction of a shared data element by said updater until pre-existing references to said shared data element are removed, comprising:
- a grace period detection component adapted to check for the presence of readers that are accessing said shared data element without using locks to exclude other updaters;
- terminating grace period detection to initiate deferred destruction of said data element if there are no readers accessing said shared data element;
- if there are readers accessing said shared data element, implementing a lock and checking again for the presence of said readers;
- wherein said check comprises consulting a pair of counters that readers manipulate when accessing said shared data 3 element;
- wherein said check comprises summing said counters.

7. A system in accordance with claim 6 wherein said check comprises performing two counter summations.

8. A system in accordance with claim 7 wherein said check comprises implementing a memory barrier between said summations.

9. A system in accordance with claim 7 wherein said check comprises performing a first summation of said counters, implementing a memory barrier if the result of said first counter summation is a value indicating the absence of readers accessing said shared data element, performing a second summation of said counters, and terminating grace period detection if the result of each of said first counter summation and said second counter summation is a value indicating the absence of readers accessing said shared data element.

10. A computer program product, comprising:
- one or more non-transitory machine-useable media;
- logic provided by said one or more media for programming a data processing platform to perform fast path detection by an updater of a grace period for deferring the destruction of a shared data element by said updater until pre-existing references to said shared data element are removed, as by:
- checking for the presence of readers that are accessing said shared data element without using locks to exclude other updaters;
- terminating grace period detection to initiate deferred destruction of said data element;
- if there are no readers accessing said shared data element;
- if there are readers accessing said shared data element, implementing a lock and checking again for the presence of said readers;
- wherein said checking comprises consulting a pair of counters that readers manipulate when accessing said shared data element;
- wherein said checking comprises summing said counters.

11. A computer program product in accordance with claim 10 wherein said check comprises performing two counter summations.

12. A computer program product in accordance with claim 11 wherein said checking comprises implementing a memory barrier between said summations.

13. A computer program product in accordance with claim 11 wherein said checking comprises performing a first summation of said counters, implementing a memory barrier if the result of said first counter summation is a value indicating the absence of readers accessing said shared data element, performing a second summation of said counters, and terminating grace period detection if the result of each of said first counter summation and said second counter summation is a value indicating the absence of readers accessing said shared data element.

14. A computer program product in accordance with claim 13 wherein one of said counters has a bias value indicating that said counter is a current counter and said value indicating the absence of readers accessing said shared data element is any value that is less than or equal to said bias value.

* * * * *